Figure 1:
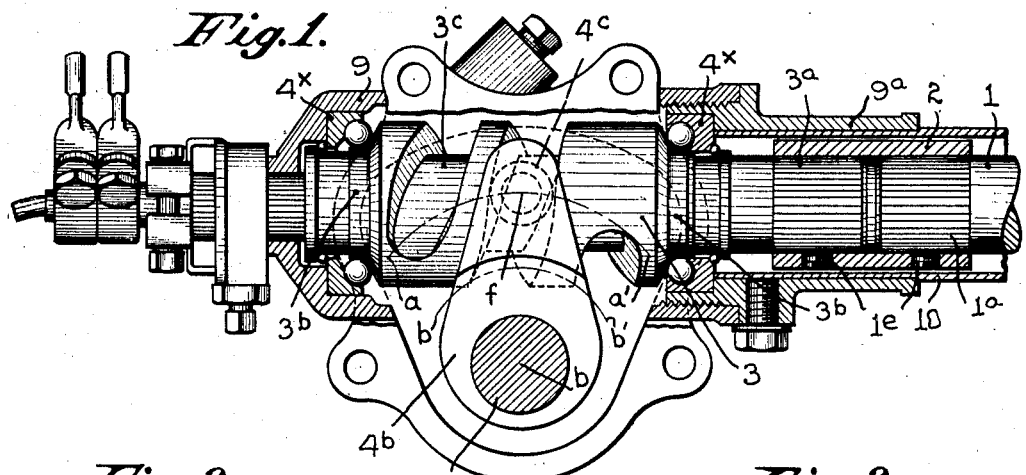

Dec. 29, 1925.  1,567,997
D. E. ROSS
STEERING GEAR
Filed April 30, 1924  2 Sheets-Sheet 1

David E. Ross, Inventor;
By Alexander Foster
Attorneys.

Dec. 29, 1925.

D. E. ROSS

STEERING GEAR

Filed April 30, 1924    2 Sheets-Sheet 2

1,567,997

Inventor
David E. Ross
By Alexander Foster Attorneys

Patented Dec. 29, 1925.

1,567,997

UNITED STATES PATENT OFFICE.

DAVID E. ROSS, OF LA FAYETTE, INDIANA, ASSIGNOR TO ROSS GEAR & TOOL COMPANY, OF LA FAYETTE, INDIANA, A CORPORATION OF INDIANA.

STEERING GEAR.

Application filed April 30, 1924. Serial No. 710,179.

*To all whom it may concern:*

Be it known that I, DAVID E. Ross, a citizen of the United States, residing at La Fayette, in the county of Tippecanoe and State of Indiana, have invented certain new and useful Improvements in Steering Gears; and I hereby declare that the following is a full, clear, and exact description thereof, reference being had to the accompanying drawings, which form part of this specification.

This application is a continuation in part of and substitute for my application for steering gears, filed September 5, 1922, Serial No. 586,145.

The object of this invention is to provide a novel steering gear for automobile vehicles, and the like; which gear is simple in construction, efficient and reliable in operation; will certainly hold the steering wheels' in any desired position; and will relieve the driver from road shocks due to back lash from the steering wheels to the steering shaft when the front wheels of the vehicle are approximately in straight away driving position.

In this invention rotary motion of the steering shaft is directly converted into rocking motion of the rocker-arm shaft by means of an actuating member having a helical cam groove connected to the steering shaft; and the varying helical groove in said actuating member is engaged by a pin on an arm on the "rocker shaft," which lies at right angles to the steering shaft, said groove being so formed that there will be a continuous uniform engagement between opposite sides of the pin and opposite sides of the helical groove in the actuating member; and at all times and in all positions of the pin in the groove this contact is maintained, so that no vibration or chatter or play of the pin in the groove is permitted at any point of the travel of the pin in the groove.

When the parts are in normal "straight ahead" position the pin is at the longitudinal center of the length of the groove in the actuating member; but when such actuating member is turned on its axis at uniform speed the related rocker shaft is rocked by the movement of the pin from the center of the groove toward either end thereof with preferably a gradually accelerated motion; and if the actuating member is then reversed the pin will be moved back toward the longitudinal center of the groove with preferably a gradually retarded motion; the gradual acceleration and retardation of the movement of the pin being caused by the varying pitch of the groove in the actuating member.

In such steering gear the rocker of the steering shaft is at right angles to the axis of the actuating member and consequently the pin on the rocker shaft arm, engaging the groove in the actuating member, must traverse an arc in passing from one extreme of its movement to the other, or in moving from one end of the groove in the actuating member to the other; and in traversing this arc the pin will necessarily be constantly varying in distance from the axis of the actuating member, and in order to maintain the opposite sides of the pin in close contact with the opposite sides of the groove, at any and all points, the helical groove in such actuating member has to be made with exceeding nicety and accuracy. The usual method of and machine for cutting spiral threads or grooves will not cut a groove by which the arcuate movement of the pin can be compensated for; nor make a groove which will provide for a continuous uniform engagement between the opposite sides of the pin and the opposite sides of the helical groove.

Preferably the helical groove in the actuating member is a varying groove and has a pitch of approximately 90 degrees at the center of its length, (or point where the steering shaft is in normal "straight ahead" running position of the gear) and the groove progressively decreases in pitch from such central point toward each end thereof; such a varying groove will on a uniform rotation of the actuating member, cause an increasingly accelerated movement of the rocker shaft as the pin on the arm thereof moves from a position at the center of such groove toward either end thereof; and vice versa, as more fully hereinafter explained.

The accompanying drawings illustrate steering gears embodying the invention, which will be more fully described with reference to said drawings.

Figure 1 is a longitudinal section through a steering gear in the plane of the steering wheel shaft, the actuating member of said gear having a single groove of the peculiar character aforesaid.

Figures 2, 3:
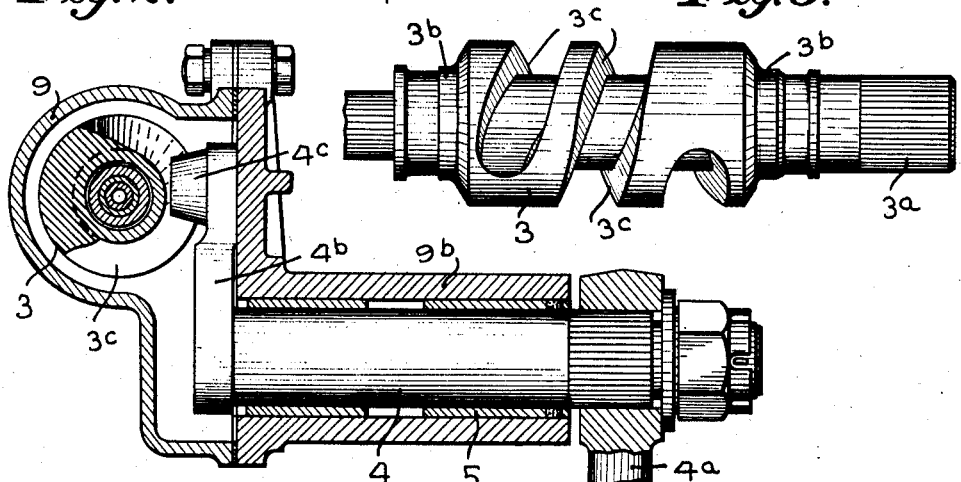
Figure 4:
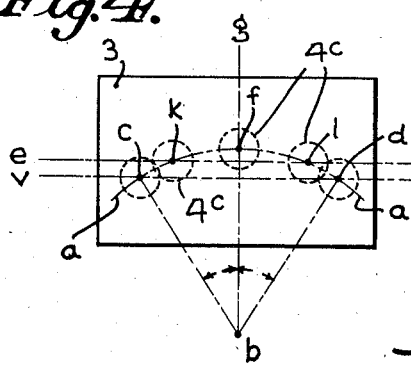
Figure 5:
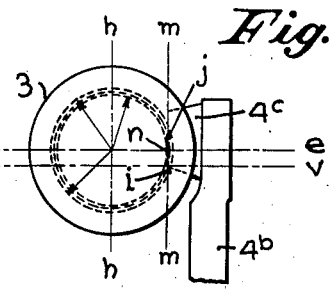
Figure 6:
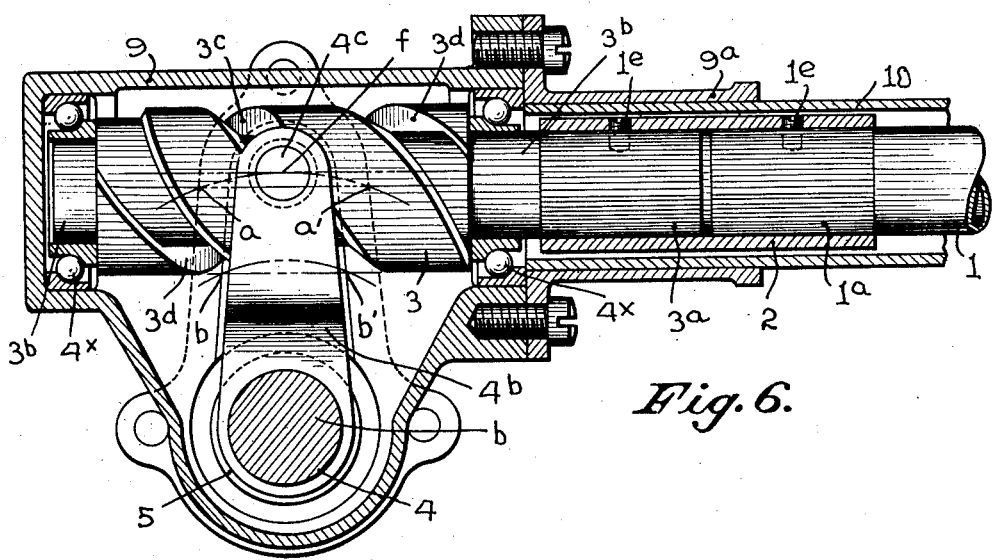
Figure 7:
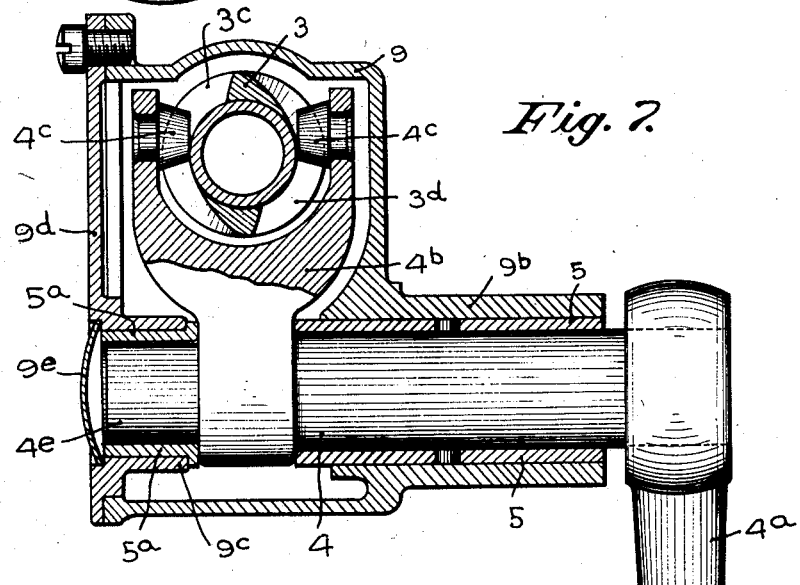
Figure 8:
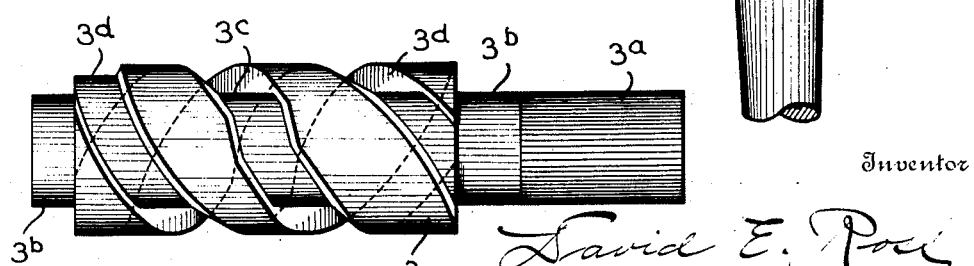

Fig. 2 is a transverse section through the gear shown in Fig. 1 in the plane of the rocker shaft, the rocker shaft being shown in elevation. Fig. 3 is a side view of the actuating member detached. Figs. 4 and 5 are diagrammatic views illustrating the relation of the groove in the actuating member to the arcuate movement of the pin and the rocker shaft arm. Fig. 6 is a view similar to Fig. 1 illustrating a construction in which the actuating member has two spiral grooves of the peculiar form aforesaid, and the rocker shaft has two arms. Fig. 7 is a transverse section through Fig. 6 in the plane of the rocker shaft. Fig. 8 is a view of the actuating member shown in Figs. 6 and 7.

The steering shaft 1 may be of the usual construction. As shown in Fig. 1, this shaft has its lower end entered into a bearing $9^a$ of a casing 9 and non-rotatably secured to an actuating member 3 which is in alignment with and forms a continuation of the shaft 1. The actuating member 3 might be formed integral with shaft 1, but is preferably made separate and fixedly attached thereto. This actuating member is cylindric and is provided with journals $3^b$ mounted in suitable bearings in the casing 9, trunnions $3^b$ being mounted in ball-race bearings $4^x$, suitably confined in the casing 9; which may be of any suitable construction. In the cylindric portion of the actuating member intermediate the bearings $3^b$ is a helical groove $3^c$ which is engaged by a pin $4^c$ formed on or attached to an arm $4^b$ which is formed with or rigidly connected to, the rocker shaft 4. To the outer end of said shaft 4 is connected a steering arm $4^a$, which may be of the usual type.

Preferably the opposite side walls of the helical cam groove $3^c$ are slightly tapered or beveled and the pin $4^c$ is similarly tapered to closely fit between the walls of the cam groove.

As shown in Figs. 2 and 7, the rocker shaft 4 is mounted in a suitable bearing 5 in a lateral extension $9^b$ of casing 9, and the inner end $4^e$ of shaft 4 of Fig. 7 is mounted in a bearing in the side of casing 9 opposite bearing 5.

The helical cam groove $3^c$ in the actuating member preferably has a pitch of approximately 90 degrees at the center of its length (or point where the steering shaft is in normal "straight ahead" running position of the gear) and progressively lessens in pitch from such center point toward each end thereof. If the actuating member be rotated at uniform speed, such varying groove would cause an increasingly accelerated movement of the rocker shaft as the pin thereon moves from the position of engagement with the center of such groove toward either end thereof.

Figure 4 diagrammatically illustrates the travel of the pin $4^c$ relative to the axis of the actuating member in moving from one end of the groove $3^c$ to the other.

The dotted circles in Fig. 4 illustrate various positions of the pin $4^c$ relative to the actuating member 3 during the travel of the pin from one extreme position $c$ to the other $d$. In Fig. 4 the line $g$—$b$ intersects the center line of the rocker shaft, and indicates the mid-position of the arm of the rocker shaft which carries the pin $4^c$ that engages the groove in the actuating member. As indicated in Fig. 4, the pin 4 moves longitudinally on an arc indicated by the line $a$—$a$ whose center is at $b$, which is the axial line of the rocker shaft 4. At the two extremes of its arcuate movement, indicated at $c$ and $d$ in Fig. 4, the axis of the pin lies below the plane of the axis $c$ of the member 3. At the center of its arcuate movement (indicated at $f$ in Fig. 4) the axis of the pin $4^c$ lies above the plane of the axis $e$ of the actuating member.

Because of its arcuate movement the pin $4^c$ will more or less deeply engage the groove at different points of its movement. As the pin moves longitudinally of the actuating member it traverses a plane indicated by the line $m$—$m$, Fig. 5, which is parallel with the plane $h$—$h$ containing the axis of the actuating member. At the extreme ends of the movement of the pin $4^c$ (indicated at $c$ and $d$ in Fig. 4), the pin $4^c$ is farthest from the center of the actuating member, as indicated at $i$ in Fig. 5. If the relative location of the axis of the trunnion shaft to the axis of the actuating members is as shown, then at the central point of its movement (indicated at $f$ in Fig. 4) the pin $4^c$ is slightly farther away from the axis of the actuating member than at the points $k$, $l$ as indicated at $j$ in Fig. 5. At the intermediate points $k$ and $l$ (Fig. 4) the pin $4^c$ moving in the plane $m$—$m$ (Fig. 5) crosses the longitudinal axis of the actuating member (as indicated by the line $e$—$e$ in Figs. 4 and 5), and the pin would then be nearest the axis of the actuating member as indicated at $n$ in Fig. 5. It should be understood that the location of the axis of the trunnion shaft relative to the axis of the actuating member may be varied, within the scope of the invention.

The groove $3^c$ must be so formed and cut that close contact will always be maintained between the opposite sides of the pin $4^c$ and the opposite sides of the groove $3^c$ during the arcuate movement of pin $4^c$. Such contact must be maintained at all points of the groove and in any and all positions of the pin. As the pin has no longitudinal motion with respect to its own axis, and is parallel to the axis of its trunnion shaft, the width of the groove must correspond at all points to the diameter of the portion of the pin 4ᶜ engaging therewith at such points, so that the pin 4ᶜ (which is attached to the rocker shaft and engages the grooves of the actuating member) will exactly follow the groove and always be properly engaged with the groove.

The construction shown in Figs. 6, 7 and 8 is in general similar to that already described; in said figures, however, the actuating member 3 is shown as provided with two similar spiral grooves 3ᶜ, each of which grooves correspond to the groove 3ᶜ shown in Figs. 1 and 3. The arm 4ᵇ is shown as bifurcated, and extending on opposite sides of the actuating member, and each bifurcation carries a pin 4ᶜ to engage the opposed grooves 3ᶜ.

In the construction shown in Fig. 6 the steering shaft 1 has its end 1¹ splined in a sleeve 2 to the other end of which is splined the end 3ᵃ of the actuating member 3. The sleeve 2 and shaft 1 are also shown as enclosed in a casing tube 10 attached to the tubular part 9ᵃ of casing 9. In Fig. 7 the end 4ᵉ of the rocker shaft is shown as journaled in a bushing 5ᵃ mounted in a socket 9ᶜ in the removable end plate of the casing. The socket is shown as closed by a cap 9ᵉ.

The particular construction of the casing is not a part of the present invention; and neither is the means or manner of mounting the actuating member in the casing; nor the means or manner of connecting the steering shaft to the actuating member; all these features are non-essentials of the present invention and may be varied to suit the builder of the gear.

The pins 4ᶜ should exactly and closely fit between the opposed walls of the groove 3ᶜ and are thereby compelled to traverse exactly the course through which the pins must move to impart the desired movements to the rocker shaft.

The cam groove 3ᶜ appears but slightly different from a true spiral thread of a worm, but is actually materially different therefrom and an ordinary worm thread groove, or spiral groove would not be usable; as it is essential that the groove 3ᶜ be so formed as to accommodate and compensate for the arcuate movement of the pin 4ᶜ as above explained.

In the normal or center position of the rocker shaft arm (Figs. 1 and 6), a comparatively large angular movement of the steering wheel shaft to a relatively small angular movement of the rocker shaft could be produced by having the lead of the cam groove 3ᶜ approach 90 degrees to the center of the member 3, and a short length of lead of such pitch at the center of the cam groove (and in central position of the rocker shaft arm) eliminates road shocks in "straight away" driving, and prevents transmission of shocks on the front wheels of the vehicle back to the steering wheel; and the actuating member so formed will permit the steering wheels on "straight away" driving to "follow the road" when traveling on country roads; permitting that "road sympathy" between the front wheels and the steering wheel which is so much desired.

Preferably the rocker shaft should be rotatable through an arc of approximately 70 degrees. A gear having a great angular turn of the steering wheel to a comparatively small angular turn of the rocker shaft requires too many revolutions of the steering wheel in turning corners; and this is the detrimental feature of present known worm steering gears of large reduction. It is apparent that if the mid-position ratio of 15 to 1 were maintained throughout the full range of action of 70 degrees on the rocker shaft, the steering wheel would rotate through 1050 degrees or approximately three revolutions requiring 50% more of winding up operation on the part of the operator on the steering wheel.

The groove in the novel actuating member can be made so that two complete turns of the steering wheel are sufficient to move the rocker shaft through its complete range of 70 degrees. Two complete turns of the steering wheel equals 720 degrees. Thus the ratio in a gear using the novel actuating member is a little less than 10.3 to 1 considering the full range of action. For actual service about two turns of the steering wheel, that is, one turn either side of center position, makes a very easy gear to operate from the center. The novel gear made in accordance with this invention has the advantage of a very small angular turn of the steering wheel of a non-shock driving effect, when in mid-position, and will admit of a pre-determined angular ratio of movement of the rocker shaft and steering wheel to give the most desirable results.

In practice a variance of about 9° to 12° from a true 90° for the pitch of the groove at the center position of the pin 4ᶜ has been found desirable, so that the gear will not be irreversible in mid-position. Ordinarily the smaller the gear the faster the pin 4ᶜ should travel in moving from mid-position. For small gears the lead of the groove in the actuating member is preferably so calculated that a movement of pin 4ᶜ one degree either side of mid position will cause a travel of about 16° of the steering shaft in the smallest sized gear; in the next size gear such a movement of pin 4ᶜ will cause a movement of about 25° of the steering shaft; in the next larger size of gear such a movement of the pin will cause a movement of about 26½° of the steering shaft;

and in the largest gear, one degree of movement of the pin 4ᶜ either side of the lineal center of the groove would cause a movement of about 27° of the steering shaft.

The size of the actuating member and rocker arm should, of course, be proportioned to suit the vehicle on which such steering gear is to be used; and in calculating such parts due consideration must be given to the weight of the machine, the momentum of the moving vehicle, and the manual strength to be exerted in easily steering the gear.

In the center position of the rocker shaft (Figs. 1 and 6) the pins 4ᶜ are somewhat above the axis of the member 3, and therefore the cam groove can be slightly shallower at this point than at the points where the center of the pin crosses the axis of the screw; (which points are indicated at $k$ and $l$ in Fig. 4). The cam groove 3ᶜ can also become gradually shallower from points $k$, $l$, to the points $c$, $d$, Fig. 4 (where the pin is below line $a$—$a$ at the extreme ends of the groove). I therefore so locate the pins that when in normal central position, as in Figs. 1 and 6, they are slightly above the axis of the actuating member (as indicated at $f$, Fig. 4, and $j$, Fig. 5), in order that the cam grooves should not become too shallow at the extreme positions of the pins. It is also preferable that the cam grooves should begin at one end $c$ (Fig. 4) with a low helical angularity with respect to the axis of the shaft and gradually increase in helical angularity to the center $f$ (Fig. 4) (or point where the rocker shaft would be in mid-position, as in Figs. 1 and 6), and then gradually decrease the helical angularity in regular proportion to the other end $d$ of the groove (Fig. 4).

A gear made in accordance with the invention also has a further great advantage over worm gear steering gears now on the market as regards the leverage exerted by the actuating member 3 upon the rocker shaft 4, as in this invention the leverage is greatly enhanced due to the greater effective length of the lever arm 4ᵇ (between the axes of shafts 1 and 4) as compared with the lever arms of the present worm gear types of steering gears. Thus, as indicated in Figs. 1 and 6, the radial distance from the dotted line $a$—$a$ to the center of the rocker shaft 4 is the effective length of the rocker arm 4ᵇ (from the center of rocker shaft 4 to the center line of the pins 4ᶜ), while the distance from the line $b$—$b$ shows the effective length of the rocker arm of the heretofore known worm and segment gears, wherein the axis of the rocker shaft is the same linear distance from the axis of the steering wheel shaft as in the new gear of this invention. In my invention because the point of contact of the pin 4ᶜ is at the side of the actuating member 3, the total depth of gear is less than in a worm and segment type of gear, where the point of contact between the segment and the actuating member is at the bottom of the actuating member. Furthermore, in a worm and segment gear having a leverage equal to my gear, the distance between the center of the worm and the worm wheel is the sum of the radii from the pitch circle. This increased length of the radius ($b$—$f$) greatly enhances the leverage exerted by the actuating member 3 on arm 4ᵇ and diminishes the unit pressure on the pins 4ᶜ and correspondingly lessens the wear thereon.

The pin 4ᶜ may be of any suitable form, and may be made integral with arm 4ᵇ or separately therefrom, out of a metal that will take a maximum hardness and tenacity in heat treatment. The rocker arm 4ᵇ and rocker shaft 4 do not have to be of as high grade material as the pins 4ᶜ. The actuating member 3 is virtually an integral part of steering shaft 1 and might be formed integral therewith, but it is preferable to make it separate and rigidly connect them together. The shaft 1 is usually made of steel tubing, but the actuating member 3 should be made of a material that will take a heat treatment which will render it very hard and tenacious and capable of withstanding the severe strains to which it is subjected.

The novel gear embodying this invention reduces the cost of manufacture; is efficient and reliable in operation, is as effective as the worm and wheel type of gear; will permit the steering wheels to "follow" ordinary road ruts; will prevent "back lash" or transmission of road shocks to the steering wheel in approximately straight away driving positions; and greatly reduce the manual labor required to operate the gear. Such novel gear is also very flexible in design as the cam grooves can be readily made to vary the throw of the rocker shaft, or relative movement of actuating member and rocker arm, to suit the requirements of the manufacturer of any particular vehicle on which the gear is to be used.

What I claim is:

1. In a steering gear, a steering shaft provided with an approximately helical cam groove gradually lessening in depth toward each end thereof; a rocker shaft at right angles to the steering shaft, and an arm on said rocker shaft engaging the cam groove; whereby rotation of the steering shaft imparts motion to the rocker shaft.

2. A steering gear as set forth in claim 1, having the point of engagement of said arm with the groove lying slightly beyond the axis of the steering shaft, at the side of the said axis opposite the rocker shaft, when said rocker shaft is in mid-position.

3. In a steering gear, a steering shaft provided with an approximately helical cam groove deepest at points intermediate its central point and each end thereof, and gradually lessening in depth from each of said intermediate points both toward the center and each end of the groove; a rocker shaft at right angles to the steering shaft; and an arm on said rocker shaft engaging the cam groove, whereby rotation of the steering shaft imparts motion to the rocker shaft.

4. In a steering gear as set forth in claim 3, the point of engagement of said arm with the groove lying slightly beyond the axis of the steering shaft, at the side of said axis opposite the rocker shaft, when said rocker shaft is in mid-position.

5. For a steering gear, an actuating member having an approximately helical cam groove deepest at points intermediate its central point and each end thereof and gradually lessening in depth from said intermediate points toward the center, and each end thereof.

6. In a steering gear, a steering shaft, a cylindric actuating member connected with said shaft and having an approximately helical cam groove gradually decreasing in helical angularity with respect to the axis of the actuating member from the central point towards each end of the groove; a rocker shaft; and an arm on said rocker shaft having a pin engaging the cam groove in said actuating member, whereby uniform rotation of the actuating member imparts a varying extent of motion to the rocker shaft.

7. In a steering gear, a steering shaft, a cylindric actuating member connected with said shaft and provided with an approximately helical cam groove gradually lessening in depth toward each end thereof; a rocker shaft, and an arm on said rocker shaft having a pin engaging the cam groove in the actuating member.

8. In a steering gear, a steering shaft provided with similar opposite varying helical cam grooves; a rocker shaft at right angles to the steering shaft; and an arm on said rocker shaft provided with pins engaging the said cam grooves, whereby rotation of the steering shaft imparts motion to the rocker shaft varying according to the position of the pins in the grooves.

9. In a steering gear as set forth in claim 8, each cam groove being deepest at the points where the axes of the pins move across the plane of the axis of the steering shaft, and gradually lessening in depth from each of such points toward the center and each end of the groove.

10. In a steering gear as set forth in claim 8, each cam groove gradually decreasing in helical angularity with respect to the axis of the shaft from the center toward each end; and being also deepest at the points where the axes of the pins move across the axis of the steering shaft, and gradually lessening in depth from each of such points toward the center and each end of the groove.

11. In a steering gear, a steering shaft, a cylindric actuating member operated by said shaft and provided with diametrically opposite approximately helical varying cam grooves; a rocker shaft at right angles to the steering shaft; and an arm on said rocker shaft bifurcated to embrace the actuating member and each furcation being provided with a pin engaging the adjacent groove; whereby rotation of the actuating member by the steering shaft imparts direct rocking motion to the rocker shaft, said motion varying in extent according to the positions of the pins in the grooves.

12. In a steering gear as set forth in claim 11, the points of engagement of said pins with the grooves being slightly beyond the axis of the steering shaft, at the side of said axis opposite the rocker shaft, when said rocker shaft is in mid-position.

13. In a steering gear as set forth in claim 11, each cam groove gradually decreasing in helical angularity with respect to the axis of the steering shaft from the center toward each end thereof.

14. In a steering gear as set forth in claim 11, each cam groove being deepest at the points where the axes of the pins move across the axis of the steering shaft, and gradually lessening in depth from each of such points toward the center and each end of the groove.

15. In a steering gear as set forth in claim 11, each cam groove gradually decreasing in helical angularity with respect to the axis of the shaft from the center toward each end; and also being deepest at the points where the axes of the pins move across the axis of the steering shaft and gradually lessening in depth from each of such points toward the center and each end of the groove.

16. A steering gear as set forth in claim 1 having the point of engagement of said arm with the groove when said rocker shaft is in mid position slightly beyond the axis of the steering shaft, and at the side of said axis opposite the rocker shaft, said part intersecting a plane containing the axis of the steering shaft at two points of its movement from one end of the groove to the other.

17. In a steering gear as set forth in claim 7, having the point of engagement of said pin with the groove when said rocker shaft is in mid position slightly beyond the axis of the steering shaft, and at the side of said axis opposite the rocker shaft; said pin intersecting a plane containing the axis of the steering shaft at two points of its movement from one end of the groove to the other.

18. In a steering gear as set forth in claim 11, having the points of engagement of the pins with the grooves when said rocker shaft is in mid position slightly beyond the axis of the steering shaft and at the side of said axis opposite the rocker shaft; said pins intersecting a plane containing the axis of the steering shaft at two points of their movement from one end of the groove to the other.

19. In a steering gear, a steering shaft provided with an actuating member having a varying helical cam groove; a rocker shaft at right angles to the steering shaft; and an arm on said rocker shaft having a part engaging the cam groove, said part moving in a plane substantially perpendicular to the rocker shaft and parallel with and to one side of the plane containing the steering shaft; whereby a certain extent of rotation of the steering shaft actuating member imparts a varying extent of motion to the rocker shaft according to the point of engagement of the arm and groove.

20. A steering gear as set forth in claim 19, having the point of engagement of said arm part with the groove when said rocker shaft is in mid position beyond the axis of the steering shaft and at the side of said axis opposite the rocker shaft; said part intersecting a plane containing the axis of the steering shaft at two points of its movement from one end of the groove to the other.

21. In a steering gear, a steering shaft provided with a cylindric actuating member having an approximately helical cam groove gradually decreasing in helical angularity with respect to the axis of said member from the central point towards each end of the groove; a rocker shaft at right angles to the steering shaft; and an arm on said rocker shaft having a pin engaging the cam groove said pin being substantially parallel with the rocker shaft and moving in a plane substantially perpendicular to the rocker shaft and parallel with and to one side of the plane containing the steering shaft; whereby rotation of the steering shaft imparts motion to the rocker shaft.

22. In a steering gear as set forth in claim 21, the point of engagement of said pin with the groove when said rocker shaft is in mid position being slightly beyond the axis of the steering shaft, and at the side of said axis opposite the rocker shaft; said pin intersecting a plane containing the axis of the steering shaft at two points of its movement from one end of the groove to the other.

23. In a steering gear, a steering shaft, a cylindrical actuating member operatively connected with said shaft and provided with an approximately helical cam groove; a rocker shaft at right angles to the steering shaft; and an arm on said rocker shaft having a pin engaging the cam groove in said member whereby rotation of the actuating member by the steering shaft imparts motion to the rocker shaft, the pin in its central position lying at one side of the plane of the axis of the actuating member and moving in an arc which twice intersects said plane at points intermediate the center of the groove and the ends thereof, substantially as described.

24. In a steering gear, a steering shaft, a cylindrical actuating member operatively connected with said shaft and provided with an approximately helical cam groove; a rocker shaft at right angles to the steering shaft; and an arm on said rocker shaft having a pin engaging the cam groove in said member whereby rotation of the actuating member by the steering shaft imparts motion to the rocker shaft, the pin moving in an arc which twice intersects the plane of the axis of the actuating member at points intermediate the center of the groove and the ends thereof, said cam groove gradually decreasing in helical angularity with respect to the axis of the shaft from the center toward each end.

25. As an article of manufacture an actuating member for a steering gear consisting of a cylinder of substantially uniform diameter having an approximately helical cam groove in its periphery gradually decreasing in helical angularity from the central point of the groove towards each end thereof; substantially as described.

26. As an article of manufacture an actuating member for a steering gear consisting of a cylinder of substantially uniform diameter having an approximately helical cam groove in its periphery gradually decreasing in helical angularity and also varying in depth from the central point of the groove towards each end thereof, substantially as described.

In testimony that I claim the foregoing as my own, I affix my signature.

DAVID E. ROSS.